US012321455B2

(12) United States Patent
Sandoval et al.

(10) Patent No.: US 12,321,455 B2
(45) Date of Patent: *Jun. 3, 2025

(54) MALICIOUS SOFTWARE DETECTION BASED ON API TRUST

(71) Applicant: OPEN TEXT INC., Menlo Park, CA (US)

(72) Inventors: Andrew L. Sandoval, San Antonio, TX (US); David Alan Myers, Broomfield, CO (US); John R. Shaw, II, Broomfield, CO (US); Eric Klonowski, Broomfield, CO (US)

(73) Assignee: Open Text Inc., Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/441,638

(22) Filed: Feb. 14, 2024

(65) Prior Publication Data

US 2024/0184888 A1 Jun. 6, 2024

Related U.S. Application Data

(63) Continuation of application No. 18/092,355, filed on Jan. 2, 2023, now Pat. No. 11,947,670, which is a continuation of application No. 15/952,980, filed on Apr. 13, 2018, now Pat. No. 11,544,379.

(51) Int. Cl.
*G06F 21/00* (2013.01)
*G06F 21/55* (2013.01)
*G06F 21/56* (2013.01)

(52) U.S. Cl.
CPC .......... *G06F 21/566* (2013.01); *G06F 21/554* (2013.01); *G06F 2221/033* (2013.01)

(58) Field of Classification Search
CPC ................ G06F 21/566; G06F 21/554; G06F 2221/033; G06F 21/52; G06F 21/577
See application file for complete search history.

(56) References Cited

U.S. PATENT DOCUMENTS

| | | | | |
|---|---|---|---|---|
| 7,076,557 | B1* | 7/2006 | LaMacchia | G06F 21/52 726/4 |
| 9,606,815 | B2* | 3/2017 | Goldstein | G06F 9/44505 |
| 2005/0055565 | A1* | 3/2005 | Fournet | G06F 21/577 726/26 |
| 2015/0213260 | A1* | 7/2015 | Park | G06F 21/566 726/23 |

(Continued)

*Primary Examiner* — Yogesh Paliwal
(74) *Attorney, Agent, or Firm* — Sprinkle IP Law Group

(57) ABSTRACT

Examples of the present disclosure describe systems and methods for malicious software detection based on API trust. In an example, a set of software instructions executed by a computing device may call an API. A hook may be generated on the API, such that a threat processor may receive an indication when the API is called. Accordingly, the threat processor may generate a trust metric based on the execution of the set of software instructions, which may be used to determine whether the set of software instructions poses a potential threat. For example, one or more call stack frames may be evaluated to determine whether a return address is preceded by a call instruction, whether the return address is associated with a set of software instructions or memory associated with a set of software instructions, and/or whether the set of software instructions satisfies a variety of security criteria.

20 Claims, 8 Drawing Sheets

(56) References Cited

U.S. PATENT DOCUMENTS

| | | | |
|---|---|---|---|
| 2016/0357958 A1* | 12/2016 | Guidry | G06F 21/53 |
| 2017/0039371 A1* | 2/2017 | Lukacs | G06F 21/564 |
| 2017/0046518 A1* | 2/2017 | Chen | G06F 21/566 |
| 2019/0081983 A1* | 3/2019 | Teal | H04L 47/2475 |

* cited by examiner

MALICIOUS SOFTWARE DETECTION BASED ON API TRUST

CROSS-REFERENCE TO RELATED APPLICATION(S)

This application is a continuation of, and claims a benefit of priority under 35 U.S.C. 120 from, U.S. patent application Ser. No. 18/092,355, filed Jan. 2, 2023, issued as U.S. Pat. No. 11,947,670, entitled "MALICIOUS SOFTWARE DETECTION BASED ON API TRUST," which is a continuation of, and claims a benefit of priority under 35 U.S.C. 120 from, U.S. patent application Ser. No. 15/952,980, filed Apr. 13, 2018, issued as U.S. Pat. No. 11,544,379, entitled "MALICIOUS SOFTWARE DETECTION BASED ON API TRUST," which are fully incorporated by reference herein for all purposes.

BACKGROUND

In examples, a variety of application programming interfaces (APIs) may be used when executing a set of software instructions on a computing device. However, such APIs may be used by both benign and malicious software, such that it may be difficult to identify software threats based on API usage without also identifying false positives.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe systems and methods for malicious software detection based on API trust. In an example, a set of software instructions executed by a computing device may call an application programming interface (API). A hook may be generated on the API, such that a threat processor may receive an indication when the set of software instructions calls the API. Accordingly, the threat processor may evaluate aspects of the execution of the set of software instructions in order to generate a trust metric, which may be used to determine whether the set of software instructions poses a potential threat.

As an example, the trust metric may be generated by evaluating one or more call stack frames to determine whether a return address of the call stack frame is preceded by a call instruction, whether the return address is associated with a set of software instructions or memory associated with a set of software instructions, and/or whether the set of software instructions satisfies a variety of security criteria. Accordingly, the generated trust metric may reflect the evaluation result of one or more call stack frames from the call stack, such that it may be possible to identify the presence of a return-oriented-programming attack or return flow manipulation, among other potential computer security threats. The trust metric may then be evaluated based on a threshold or other analysis to determine whether the set of software instructions is a potential threat. If so, a variety of corrective actions may be performed.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Non-limiting and non-exhaustive examples are described with reference to the following figures.

DETAILED DESCRIPTION

Figure 1:
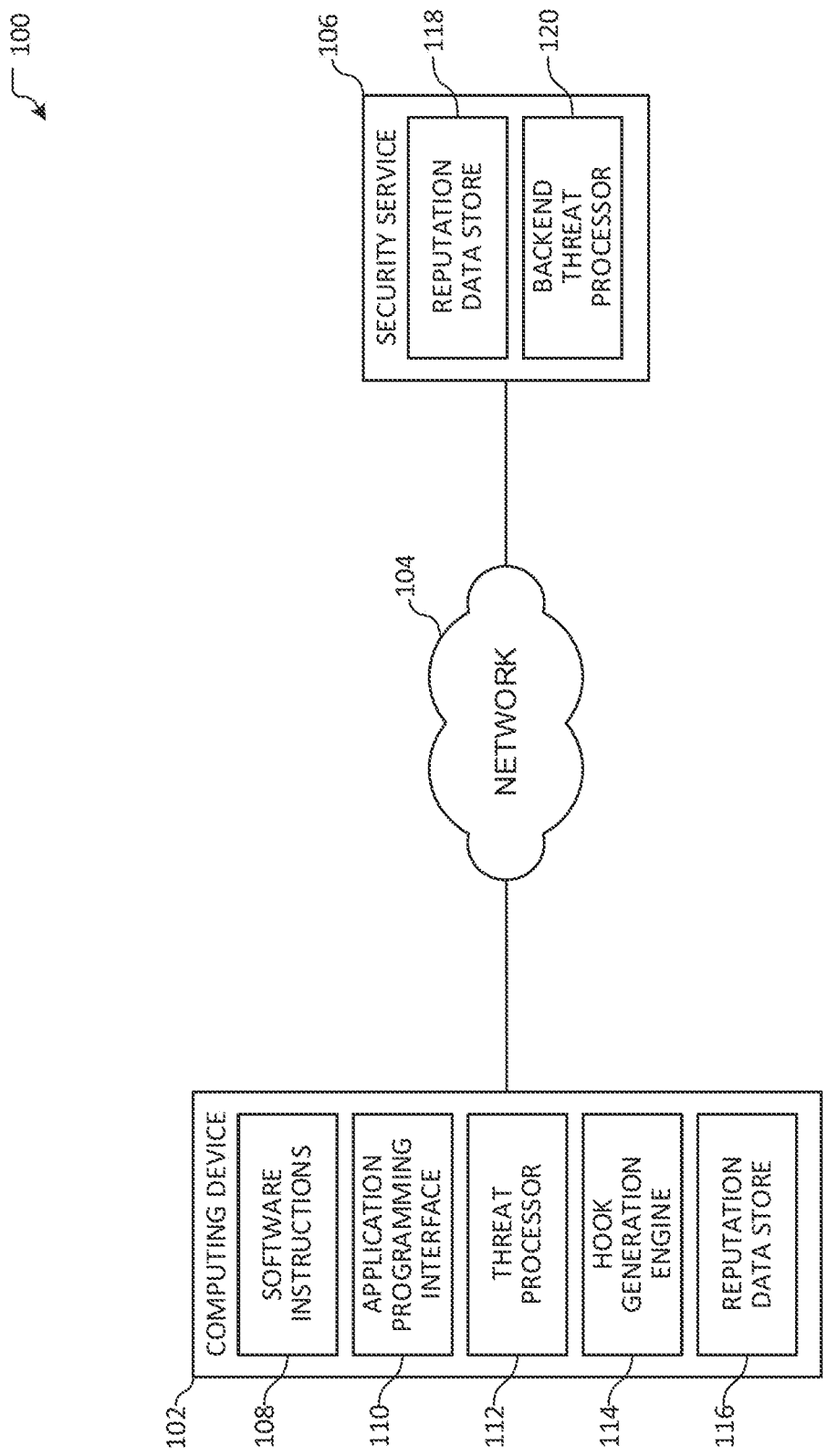
FIG. 1 illustrates an overview of an example system for malicious software detection based on API trust.

Various aspects of the disclosure are described more fully below with reference to the accompanying drawings, which form a part hereof, and which show specific example aspects. However, different aspects of the disclosure may be implemented in many different forms and should not be construed as limited to the aspects set forth herein; rather, these aspects are provided so that this disclosure will be thorough and complete, and will fully convey the scope of the aspects to those skilled in the art. Aspects may be practiced as methods, systems or devices. Accordingly, aspects may take the form of a hardware implementation, an entirely software implementation or an implementation combining software and hardware aspects. The following detailed description is, therefore, not to be taken in a limiting sense.

In an example, a computing device may comprise or make available one or more application programming interfaces (APIs), which may be used when executing a set of software instructions. However, both benign software and malicious software may use similar APIs when executed and, in some examples, may even use such APIs in similar ways. As such, it may be difficult to accurately determine whether a given set of software instructions is benign, or whether it may pose a potential computer security threat. Such difficulties may cause user frustration, incorrect assessment of both malicious and benign software (e.g., false positives and false negatives), and may generally reduce overall computer security.

Accordingly, the present disclosure provides systems and methods for malicious software detection based on API trust. In an example, one or more hooks may be used to intercept and/or manage execution when an API is called by a set of software instructions. Execution control may be passed to a threat processor, which may evaluate aspects of the execution environment to determine whether the set of software instructions is a potential threat. As an example, a call stack associated with the execution of the set of software instructions may be evaluated to determine whether aspects of the call stack are benign or if a potential threat may exist, thereby generating a trust metric for the call stack. In some examples, if a potential threat is identified, an indication or prompt may be presented to a user, an entry may be generated in a log, corrective action may be taken (e.g., terminating execution or adjusting execution parameters, access to one or more APIs, or access to memory, etc.), and/or data may be gathered for contemporaneous or later analysis, among other examples.

As an example, a computing device may be any of a variety of devices, including, but not limited to, a mobile computing device, a tablet computing device, a desktop or laptop computing device, an Internet of Things (IoT) computing device, a server computing device, or a distributed computing device (e.g., which may be comprised of a plurality of computing devices). An API provided by or made available by the computing device may enable a set of software instructions to engage in file system access or searching, network communication, process management, memory management, or communication with a specific hardware component (e.g., device drivers, sensor data access, etc.), among other functionality. While the term API is used, it will be appreciated than an API may comprise any of a wide variety of software interfaces, commands, libraries, or services, among others, useable by a set of software instructions when executed by a computing device. In examples, at least some of APIs on which hooks are generated may be those determined to enable bootstrapping of potentially malicious behavior.

As used herein, "software," "software instructions," and a "set of software instructions" may be used interchangeably. Example software may include applications, plugins, scripts, modules, drivers, and/or web applications, among other examples. In some examples, software may be pre-compiled, compiled at runtime, or interpreted at runtime. In another example, software may execute in kernel mode, user mode, or a combination thereof.

In some examples, one or more hooks may be generated by a threat processor in order to determine when a given API is called by a set of software instructions. In an example, the hook may be generated by replacing, overwriting, or altering aspects of the API in order to intercept a call to the API. In another aspect, the threat processor may generate interrupt handlers and/or register for event handlers in order to determine when a given intercept or event occurs. It will be appreciated that while examples herein are described with respect to generating hooks to intercept or manage execution, other techniques may be used to monitor API calls by a set of software instructions.

When it is determined that a set of software instructions has made an API call, the generated hook may cause execution to be passed to a threat processor. In some examples, execution may be passed to a threat processor executing in user mode (e.g., an application, a service, or a module within an application, etc.) or a threat processor executing in kernel mode (e.g., provided by a kernel module, a system service, etc.), or a combination thereof. The threat processor may generate a trust metric by evaluating a call stack associated with the execution of the software instructions that resulted in the API call. While the examples set forth herein are described with respect to performing such operations prior to continuing execution, it will be appreciated that, in other examples, at least some of the operations may alternatively or additionally be performed substantially contemporaneously with continued execution and/or after execution of the API, among other examples.

As an example, evaluating the call stack may comprise evaluating one or more call stack frames. For example, call stack frames may be evaluated sequentially, in reverse order, or in any of a variety of other orders. In some examples, only a subset of call stack frames may be evaluated. In examples, a call stack frame may be evaluated to determine whether a return address of the call stack frame is preceded by a call instruction, whether the return address is associated with a set of software instructions or memory associated with a set of software instructions, and/or whether the set of software instructions satisfies a variety of security criteria. In an example, aspects of the evaluation may be cached as a cache entry, such that a later call stack frame having the same return address may be evaluated based at least in part on the cached evaluation, which may thereby reduce at least a part of the processing associated with the evaluation. Accordingly, the generated trust metric may reflect the evaluation result of one or more call stack frames from the call stack, such that it may be possible to identify the presence of a return-oriented-programming attack or return flow manipulation, among other potential computer security threats.

Example security criteria include whether the set of software instructions is digitally signed by a trusted certificate and/or a certificate issued by a trusted certificate authority, whether the set of software instructions is listed in a trusted security catalog, whether the set of software instructions has been whitelisted (e.g., by a user, by a system administrator, by an automated process, etc.), and/or an analysis of reputation information from a security service (e.g., whether the set of software instructions has been identified as potentially malicious, whether the reputation of the set of software instructions is below a threshold, etc.). In some examples, the type and/or rigor of the evaluation that is performed may vary depending on a variety of factors, including, but not limited to, the type of software (e.g., whether the software is an application, a plugin, a driver, etc.), whether the software is executing in user mode and/or kernel mode, and/or the type of API called by the software.

If the trust metric indicates the set of software instructions may comprise a potential threat, any of a variety of actions may be performed. As an example, an indication or prompt may be generated and presented (e.g., to a user, a system administrator, etc.), which may comprise a display of information associated with the potential threat (e.g., a threat type, a set of software instructions associated with the potential threat, education materials, etc.) and/or one or more suggested actions. In some examples, a selection of a suggested action may be received by the generated prompt, such that the suggested action may be performed. In another example, an entry may be generated in a log and/or an indication may be provided to another component. In other examples, corrective action may be taken automatically (e.g., terminating execution or adjusting execution parameters, access to one or more APIs, or access to memory, etc.) and/or data may be gathered for contemporaneous or later analysis. For example, if a memory management API is called to allocate executable memory, an example of adjusting an execution parameter may comprise modifying the attributes of the allocated memory to remove the executable attribute. Other execution parameters that may be adjusted include, but are not limited to, file permissions, user privileges, network firewall settings, and/or access or privileges associated with an API. While example actions are described herein, it will be appreciated that other actions may alternatively or additionally be performed.

FIG. 1 illustrates an overview of an example system 100 for malicious software detection based on API trust. As illustrated, system 100 is comprised of computing device 102, network 104, and security service 106. In an example, computing device 102 and security service 106 may communicate by way of network 104. As an example, computing devices 102 and security service 106 may communicate using wired and/or wireless connections to network 104. While system 100 is illustrated as having one computing device 102, one network 104, and one security service 106, it will be appreciated that other examples may comprise alternate quantities of such elements.

Computing device 102 may be any of a variety of devices, including, but not limited to, a mobile computing device, a tablet computing device, a desktop or laptop computing device, an IoT computing device, a server computing device, or a distributed computing device. Computing device 102 is illustrated as comprising software instructions 108, application programming interface (API) 110, threat processor 112, hook generation engine 114, and reputation data store 116. In some examples, computing device 102 may form at least a part of an execution environment in which an operating system (OS) and/or other software may execute.

For example, software instructions 108 may execute on computing device 102. Software instructions 108 may be an application, a plugin, a script, a module, a driver, and/or a web application, among other examples. In some examples, software instructions 108 may be pre-compiled, compiled at runtime, or interpreted at runtime. In another example, software instructions 108 may execute in kernel mode, user mode, or a combination thereof.

Software instructions 108 may call one or more APIs that are available in the execution environment of computing device 102. For example, software instructions 108 may call API 110. In some examples, API 110 may enable software instructions 108 to engage in file system access or searching, network communication, process management, memory management, or communication with a specific hardware component (e.g., device drivers, sensor data access, etc.), among other functionality. In examples, API 110 may be provided by an OS of computing device 102. While examples are discussed herein with respect to API 110, it will be appreciated that, in other examples, API 110 may comprise any of a wide variety of software interfaces, commands, libraries, or services, among others, useable by software instructions 108 when executed by computing device 102. In examples, at least some of APIs on which hooks are generated may be those determined to enable bootstrapping of potentially malicious behavior.

As illustrated, computing device 102 further comprises threat processor 112. In an example, threat processor 112 may perform aspects disclosed herein in order to provide protection from malicious or potentially malicious software. In some examples, threat processor 112 may generate a trust metric for a set of software instructions (e.g., software instructions 108) that calls an API (e.g., API 110). In some examples, one or more actions may be performed if the trust metric indicates that the software instructions may be potentially malicious, such as generating an indication or prompt for presentation to a user, generating a log entry, taking corrective action, and/or gathering data for contemporaneous or later analysis, among other examples. In examples, threat processor 112 may generate one or more hooks to determine when software instructions 108 calls API 110 using hook generation engine 114.

Hook generation engine 114 may generate one or more hooks on APIs of computing device 102, such as API 110.

In some examples, hook generation engine 114 may generate a hook by replacing, overwriting, or altering aspects of API 110 in order to intercept a call to the API by the software instructions 108, such that an indication and/or execution may be passed to threat processor 112. In another aspect, hook generation engine 114 may generate interrupt handlers and/or register for event handlers in order to determine when a given intercept or event of API 110 occurs, which again may provide an indication and/or pass execution to threat processor 112. It will be appreciated that while examples herein are described with respect to generating hooks to intercept or manage execution, other techniques may be used to monitor API calls by a set of software instructions.

In examples, threat processor 112 may evaluate a call stack associated with the execution of software instructions 108 that resulted in calling API 110. As an example, evaluating the call stack may comprise evaluating one or more call stack frames to determine whether a return address of the call stack frame is preceded by a call instruction, whether the return address is associated with a set of software instructions or memory associated with a set of software instructions, and/or whether the set of software instructions satisfies a variety of security criteria. In an example, aspects of the evaluation may be cached as a cache entry, such that a later call stack frame having the same return address may be evaluated based at least in part on the cached evaluation, which may thereby reduce at least a part of the processing associated with the evaluation.

Example security criteria include whether the set of software instructions is digitally signed by a trusted certificate and/or a certificate issued by a trusted certificate authority, whether the set of software instructions is listed in a trusted security catalog, whether the set of software instructions has been whitelisted (e.g., by a user, by a system administrator, by an automated process, etc.), and/or an analysis of reputation information. For example, a trusted security catalog may be provided by an OS executing on computing device 102, and may comprise one or more hashes, globally unique identifiers (GUIDs), or other information that may be used to validate software security when generating a trust metric. In some examples, a trusted security catalog may be digitally signed, such that the digital signature may be used to verify the trusted security catalog.

Reputation data store 116 of computing device 102 may comprise reputation information, which may be used by threat processor 112 when performing evaluations to generate a trust metric according to aspects disclosed herein. In an example, reputation information may relate to a set of software instructions (e.g., software instructions 108). As an example, reputation information may comprise a score, a threat type (e.g., ransomware, adware, etc.), a threat name, a threat description, a severity level, and/or information relating to one or more corrective actions, among other information. In some examples, reputation information associated with a set of software instructions stored by reputation data store 116 may be indexed based on an identifier.

Example identifiers include, but are not limited to, a hash, a fingerprint, a signature, or a globally unique identifier. In some examples, at least a part of the reputation information stored by reputation data store 116 may be generated locally and/or generated remotely (e.g., by security service 106). In some examples, reputation information may be retrieved from reputation data store 118 and cached by reputation data store 116. In other examples, reputation data store 116 may store one or more whitelists and/or blacklists, which may comprise indications (e.g., as may be received from a user, a system administrator, etc.) of software that is benign or malicious, among other indications.

System 100 also comprises security service 106. In an example, security service 106 may be a service for providing computer security for one or more computing devices (e.g., computing device 102). It will be appreciated that while security service 106 is illustrated as comprising elements 118-120, fewer, additional, or alternative elements may be used, or security service 106 may be provided as part of a distributed computing device or a cloud-computing system. In some examples, various aspects described above with respect to computing device 102 may additionally or alternatively be performed by security service 106. As illustrated, security service 106 further comprises reputation data store 118 and backend threat processor 120. In some examples, threat processor 112 may be provided by and/or communicate with security service 106 in order to provide computer security to computing device 102.

In an example, reputation data store 118 may comprise reputation information according to aspects disclosed herein. In some examples, backend threat processor 120 may receive a request from threat processor 112 for reputation information associated with a set of software instructions, such that backend threat processor 120 may access reputation data store 118 to provide reputation information in response. In some examples, the request may comprise an identifier as described above, which may be used to identify relevant reputation information from reputation data store 118. In some examples, entries in a whitelist and/or blacklist stored by a computing device (e.g., reputation data store 116 on computing device 102) may be aggregated by backend threat processor 120 and stored by reputation data store 118, thereby generating crowd-sourced reputation information.

As described above, a corrective action performed by threat processor 112 may comprise gathering data associated with the execution of software instructions 108. In examples, the data may be gathered when software instructions 108 are determined to be potentially malicious based on a trust metric, or when threat processor 112 is unable to determine whether software instructions 108 are benign, among other instances. The gathered data may comprise a memory dump, a stack trace, a crash dump, and/or one or more files associated with software instructions 108, among other data. In some examples, a user may opt-in to such data gathering. As described above, threat processor 112 may evaluate the gathered data. In other examples, threat processor 112 may provide at least a part of the gathered data to backend threat processor 120, such that security service 106 may evaluate the gathered data. In another example, at least a part of the evaluation may be performed by both threat processor 112 and backend threat processor 120.

The gathered data may be evaluated to generate and/or update reputation information, which may be stored by reputation data store 116 and/or reputation data store 118. In some examples, the evaluation may comprise executing at least a part of the gathered data in a sandbox, virtual machine, or other environment. In other examples, the evaluation may comprise evaluating the gathered data based on heuristics and/or any of a variety of machine learning algorithms. Accordingly, the gathered data may enable security service 106, threat processor 112, and/or backend threat processor 120 to provide protection against previously unknown or unconfirmed threats. While example evaluation techniques and gathered data are described herein, it will be appreciated that other techniques and data may be used without departing from the spirit of this disclosure.

Figure 2:
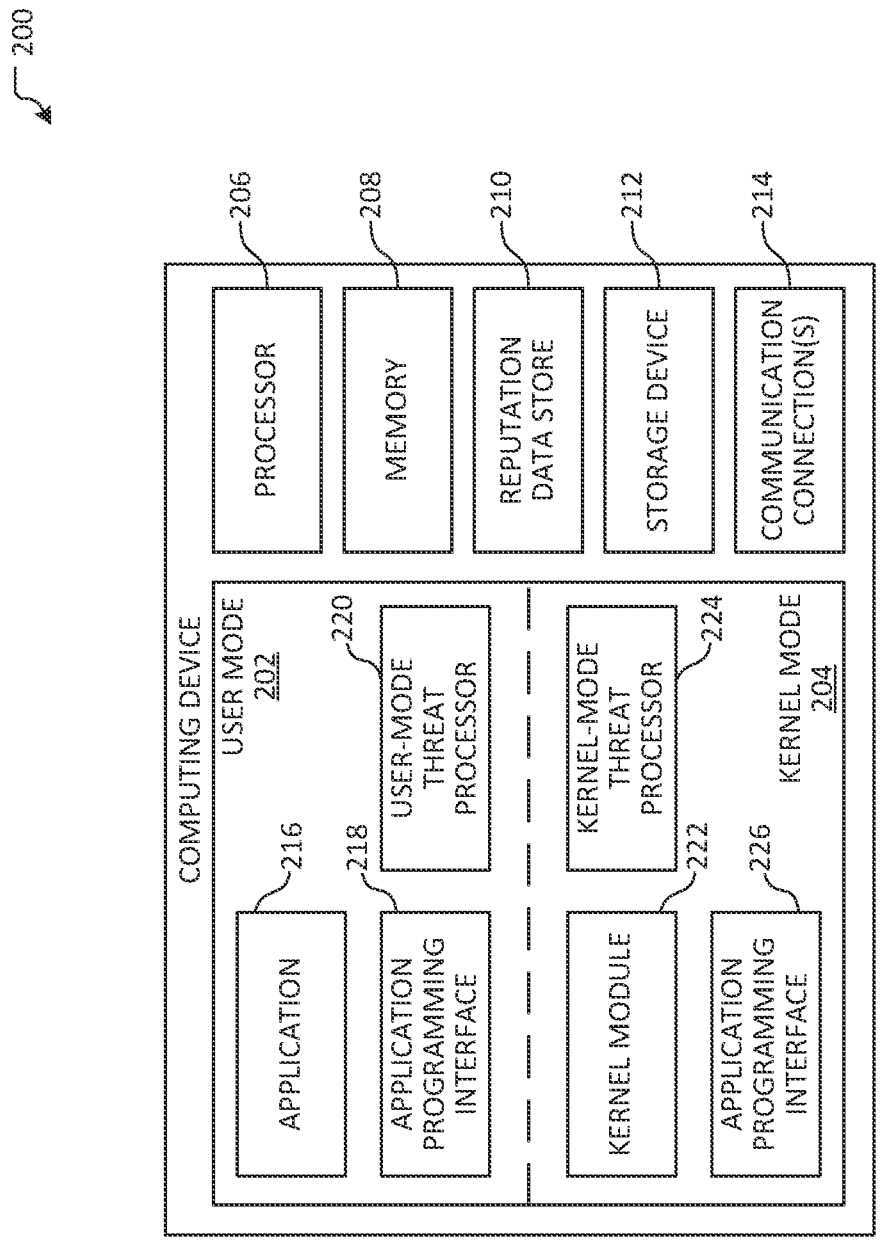
FIG. 2 illustrates an overview of an example computing device with which aspects of malicious software detection based on API trust may be performed.

FIG. 2 illustrates an overview of an example computing device 200 with which aspects of malicious software detection based on API trust may be performed. In an example, computing device 200 may be any of a variety of devices, including, but not limited to, a mobile computing device, a tablet computing device, a desktop or laptop computing device, an IoT computing device, a server computing device, or a distributed computing device. In some examples, computing device 200 may form at least a part of an execution environment in which an OS (e.g., which may comprise kernel model 222) and/or other software (e.g., application 216) may execute.

As illustrated, computing device 200 is comprised of user mode 202, kernel mode 204, processor 206, memory 208, reputation data store 210, storage device 212, and communication connections(s) 214. In some examples, processor 206, memory 208, storage device 212, and communication connection(s) 214 may be usable by software executed by computing device 200. In some examples, one or more APIs (e.g., API 218 and/or API 226) may be useable by software executed by computing device 200 to access, interface with, and/or control aspects of computing device 200 (e.g., thread creation or deletion at processor 206, memory allocation or manipulation at memory 208, file search or access at storage device 212, network communication via communication connection(s) 214, etc.).

Computing device 200 is illustrated as comprising user mode 202 and kernel mode 204. In examples, certain system-level functionality (e.g., which may be accessible via API 226) may be restricted to software (e.g., kernel module 222) operating in kernel mode 204, while other software (e.g., application 216) may instead have access to functionality available in user mode 202 (e.g., via API 218). Such a division between user mode 202 and kernel mode 204 may provide various security benefits (e.g., decreased exploitability of software bugs, improved handling of user permissions, etc.) and may ensure system-level functionality is not easily accessed by a set of software instructions. While an example separation between user mode 202 and kernel mode 204 is described herein, it will be appreciated that other separations may be used (e.g., additional, alternative, or fewer, etc.) without departing from the spirit of this disclosure.

Application 216 and kernel mode 222 are provided as example software that may be executed by computing device 200. As described above, similar aspects disclosed herein may be applied to other sets of software instructions. As illustrated, application 216 may be executed in user mode 202. In an example, application 216 may call API 218 during execution. According to aspects disclosed herein, a hook may have been generated, such that user-mode threat processor 220 may receive an indication that application 216 has called API 218. In some examples, the hook may have been generated by a hook generation engine, such as hook generation engine 114 in FIG. 1. In other examples, user-mode threat processor 220 and/or kernel-mode threat processor 224 may provide aspects of a hook generation engine.

When user-mode threat processor 220 receives an indication that application 216 has called API 218, user-mode threat processor 220 may receive execution control, such that user-mode threat processor 220 may perform any of a variety of corrective actions before execution returns to API 218 and/or application 216. While example operations are described herein as occurring prior to continued execution, it will be appreciated that at least some of the operations may alternatively or additionally be performed substantially contemporaneously with continued execution and/or after execution of API 218, among other examples. In some examples, user-mode threat processor 220 may subsequently call kernel-mode threat processor 224, such that at least a part of the operations and/or evaluations disclosed herein may be performed in kernel mode 204. In some examples, kernel-mode threat processor 224 may be used in order to provide increased security or to perform processing using resources that may be otherwise unavailable from user mode 202, among other reasons.

In another example, kernel-mode threat processor 224 may receive an indication that kernel model 222 has called API 226, such that kernel-mode threat processor 224 may receive execution control. Accordingly, kernel-mode threat processor 224 may perform any of a variety of corrective actions before execution returns to API 226 and/or kernel module 222. While example operations are described herein as occurring prior to continued execution, it will be appreciated that at least some of the operations may alternatively or additionally be performed substantially contemporaneously with continued execution and/or after execution, among other examples. In some examples, kernel-mode threat processor 224 may subsequently call user-mode threat processor 220, such that at least a part of the operations and/or evaluations disclosed herein may be performed in user mode 202. In some examples, user-mode threat processor 220 may be used because user-mode threat processor 220 may be more easily updated or maintained as a result of the potentially less stringent security restrictions that may be afforded by user mode 202.

As described above, user-mode threat processor 220 and/or kernel-mode threat processor 224 may evaluate application 216 and/or kernel module 222 when API 218 and/or 226 is called. In some examples, user-mode threat processor 220 and/or kernel-mode threat processor 224 may access reputation data store 210 to access reputation information. While reputation data store 210 is illustrated as being separate from storage device 212, it will be appreciated that reputation data store 210 may be stored by storage device 212 in an example. In some examples, reputation data store 210 may comprise a database of reputation information, one or more whitelists and/or blacklists, or other reputation information as described above. In other examples, at least a part of the data stored by reputation data store 210 may be cached from a reputation data store that is remote from computing device 200, such as reputation data store 118 in FIG. 1. While example data structures, storage techniques, and reputation information are described herein, it will be appreciated that other examples may be used without departing from the spirit of this disclosure.

In an example, user-mode threat processor 220 and/or kernel-mode threat processor 224 may evaluate a call stack associated with the execution of application 216 and/or kernel module 222. As an example, evaluating the call stack may comprise evaluating one or more call stack frames to determine whether a return address of the call stack frame is preceded by a call instruction, whether the return address is associated with a set of software instructions or memory associated with a set of software instructions, and/or whether the set of software instructions satisfies a variety of security criteria. In an example, aspects of the evaluation may be cached as a cache entry, such that a later call stack frame having the same return address may be evaluated by user-mode threat processor 220 and/or kernel-mode threat processor 224 based at least in part on the cached evaluation, which may thereby reduce at least a part of the processing associated with the evaluation.

Example security criteria include whether the set of software instructions is digitally signed by a trusted certificate and/or a certificate issued by a trusted certificate authority, whether the set of software instructions is listed in a trusted security catalog, whether the set of software instructions has been whitelisted (e.g., by a user, by a system administrator, by an automated process, etc.), and/or an analysis of reputation information (e.g., as may be stored by reputation data store 210, provided by a security service, etc.). For example, a trusted security catalog may be provided by an OS executing on computing device 200, and may comprise one or more hashes, GUIDs, or other information that may be used to validate the security of various system software when generating a trust metric. In some examples, the type and/or rigor of the evaluation that is performed may vary depending on a variety of factors, including, but not limited to, the type of software (e.g., whether the software is an application, a plugin, a driver, etc.), whether the software is executing in user mode 202 and/or kernel mode 204, and/or the type of API called by the software.

Figure 3:
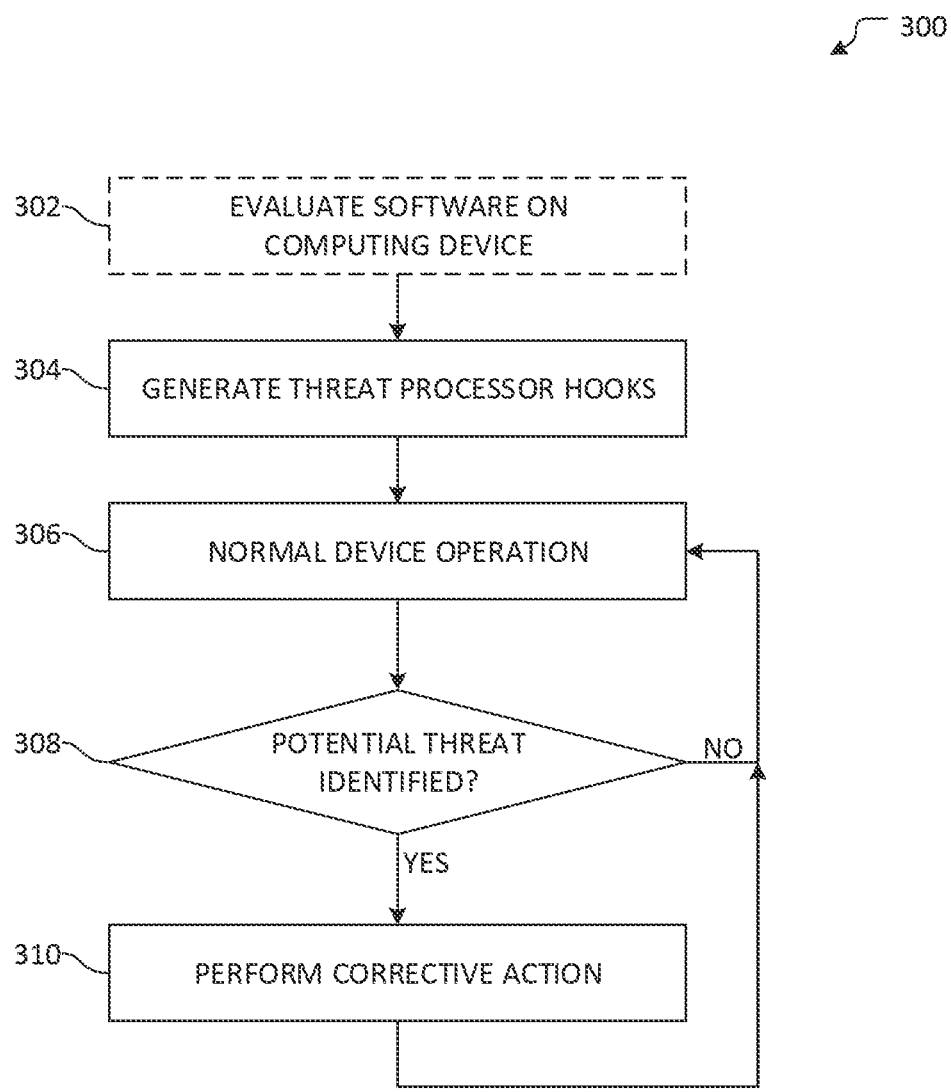
FIG. 3 illustrates an overview of an example method for malicious software detection based on API trust.

FIG. 3 illustrates an overview of an example method 300 for malicious software detection based on API trust. In an example, method 300 may be performed by a computing device, such as computing device 102 in FIG. 1 or computing device 200 in FIG. 2. Method 300 begins at operation 302, where software may be evaluated on the computing device. For example, the evaluation may comprise identifying one or more existing sets of software instructions and/or OS components, among other examples. In some examples, identified software may be added to a whitelist, such that the identified software may not be identified as malicious. In other examples, one or more prompts may be displayed, which may enable a user to indicate whether a given set of software instructions should be whitelisted or, in some examples, blacklisted. As such, a trust metric for an identified set of software instructions may be generated accordingly, wherein the trust metric may reflect that the set of software instructions is known to have previously existed on the computing device. Operation 302 is illustrated using a dashed box to indicate that the operation is optional and may be omitted. As an example, operation 302 may be performed as part of an initialization process or may be only occasionally performed.

Flow progresses to operation 304, where one or more hooks for a threat processor of the computing device may be generated. As discussed above, in some examples, method 300 may begin at operation 304. In an example, operation 304 may be performed by a hook generation engine, such as hook generation engine 114 in FIG. 1. In examples, hooks may be generated by replacing, overwriting, or altering aspects of one or more APIs of the computing device in order to intercept calls to the APIs by the software executing on the computing device. In other examples, interrupt handlers and/or event handlers may be used in order to determine when a given intercept or event of APIs on the computing device occurs. It will be appreciated that while examples herein are described with respect to generating hooks to intercept or manage execution, other techniques may be used to monitor API calls by a set of software instructions.

At operation 306, normal device operation may occur. As an example, normal device operation may comprise executing one or more sets of software instructions by the computing device. In some instances, a set of software instructions may be executed at the direction of a user or may be executed automatically, among other examples. During operation 306, a threat processor executing on the computing device may be idle or may perform any of a variety of corrective actions, including, but not limited to, post hoc analysis of gathered data or updating stored reputation information. In examples, during normal device operation, a set of software instructions may call an API on which a hook was generated by operation 304.

Accordingly, the hook may cause flow to progress to determination 308, where it may be determined whether a potential threat is identified. In some examples, execution of the set of software instructions that called the API may be paused, while in other examples execution of the set of software instructions may occur substantially contemporaneously with at least a part of the evaluation, or may occur prior to the evaluation, among other examples. As discussed in greater detail below with respect to FIGS. 4A-4D, the determination may comprise generating a trust metric for the set of software instructions that called the API.

For example, the trust metric may be generated by evaluating at least a part of a call stack associated with the execution of the software instructions that resulted in the API call. In some examples, one or more call stack frames may be evaluated to determine whether a return address of the call stack frame is preceded by a call instruction, whether the return address is associated with a set of software instructions or memory associated with a set of software instructions, and/or whether the set of software instructions satisfies a variety of security criteria, as discussed above. In other examples, cached information generated as a result of a previous evaluation associated with a return address may be used as an alternative to or in combination with a present evaluation. Accordingly, the generated trust metric may reflect the evaluation result of one or more call stack frames from the call stack, such that it may be possible to identify the presence of a return-oriented-programming attack or return flow manipulation, among other potential computer security threats.

In some examples, determining whether a potential threat is identified may comprise evaluating the trust metric based on a threshold, wherein a trust metric below a certain threshold may indicate the set of software instructions is potentially malicious. In another example, a set of ranges may be used, wherein a trust metric within one range may be benign, a trust metric within a second range may be potentially malicious, and a trust metric within a third range may be malicious. In other examples, the generated trust metric may comprise an indication as to whether the set of software instructions is malicious or benign, among other indications. For example, the generated trust metric may comprise a Boolean value that is indicative of whether the set of software instructions is benign. It will be appreciated that while example trust metrics are described herein, a trust metric may comprise any of a wide variety of data.

If, at determination 308, it is determined that a potential threat is not identified, flow branches NO to operation 306, where normal device operation may continue. In some examples where execution was suspended, execution of the set of software instructions and/or the API may resume. If, however, it is determined at determination 308 that a potential threat is identified, flow instead branches YES to operation 310, where corrective action may be performed.

For example, an indication or prompt may be generated and presented (e.g., to a user, a system administrator, etc.), which may comprise a display of information associated with the potential threat (e.g., a threat type, a set of software instructions associated with the potential threat, education materials, etc.) and/or one or more suggested actions. In some examples, a selection of a suggested action may be received, such that the suggested action may be performed. In another example, an entry may be generated in a log and/or an indication may be provided to another component. In other examples, corrective action may be taken automatically (e.g., terminating execution or adjusting execution parameters, access to one or more APIs, or access to memory, etc.) and/or data may be gathered for contemporaneous or later analysis. For example, if a memory management API is called to allocate executable memory, an example of adjusting an execution parameter may comprise modifying the attributes of the allocated memory to remove the executable attribute. While example actions are described herein, it will be appreciated that other actions may alternatively or additionally be performed at operation 310.

Once corrective action has been performed, flow progresses from operation 310 to operation 306, where normal device operation may continue. In some examples, flow may loop between operations 306, 308, and/or 310 while a computing device continues to operate (e.g., executing one or more sets of software instructions, receiving user input, etc.).

Figure 4A:
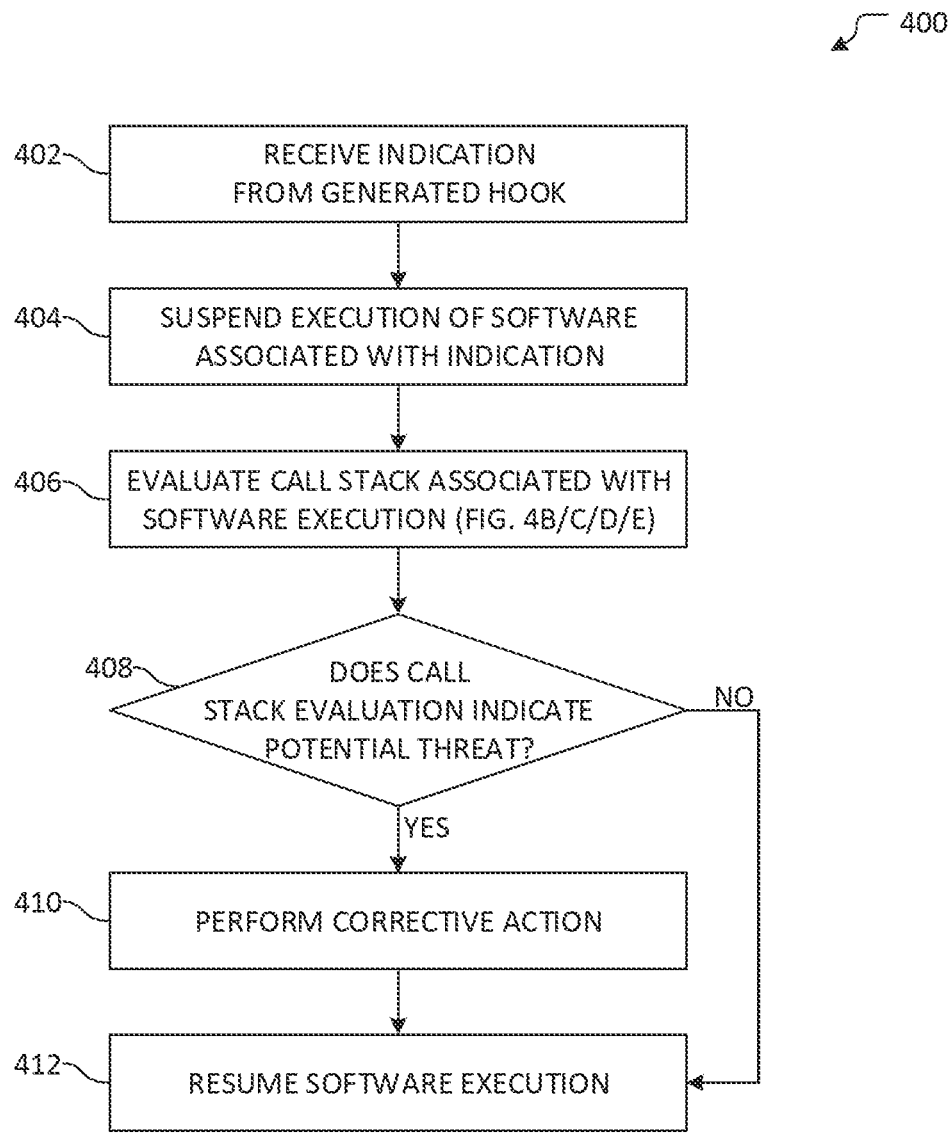
FIG. 4A illustrates an overview of an example method for evaluating the call stack of software to generate a trust metric.

FIG. 4A illustrates an overview of an example method 400 for evaluating the call stack of software to generate a trust metric. In an example, method 400 may be performed by a computing device and/or may be performed by a threat processor, such as threat processor 112 in FIG. 1 or user-mode threat processor 220/kernel-mode threat processor 224 in FIG. 2. In some examples, aspects of method 400 may be performed at determination 308, as discussed above with respect to FIG. 3. Method 400 begins at operation 402, where an indication may be received from a generated hook. In an example, the hook may have been generated by a hook generation engine, such as hook generation engine 114 in FIG. 1 or a hook generation of a threat processor such as user-mode threat processor 220 or kernel-mode threat processor 224 in FIG. 2.

At operation 404, execution of the set of software instructions associated with the received indication may be suspended. As an example, the execution may be suspended prior to executing the API that was called by the set of software instructions. In other examples, at least a part of method 400 may be performed contemporaneously or after execution has completed, such that operation 404 may be omitted.

Flow progresses to operation 406, where a call stack associated with the execution of the set of software instructions may be evaluated. In some examples, the type and/or rigor of the evaluation that is performed may vary depending on a variety of factors, including, but not limited to, the type of software (e.g., whether the software is an application, a plugin, a driver, etc.), whether the software is executing in user mode and/or kernel mode, and/or the type of API called by the software. In other examples, different evaluations may be performed for different frames of the call stack. Various aspects of example evaluations are discussed in greater detail below with respect to FIGS. 4B-4D. As described above, the evaluation may generate a trust metric, which may comprise one or more scores, indications, and/or Boolean values, among other information, relating to the evaluation of the call stack.

Accordingly, flow progresses to determination 408, where it may be determined whether the evaluation indicates the presence of a potential threat. The determination may comprise evaluating the trust metric generated at operation 406 based on a threshold, wherein a trust metric below a certain threshold may indicate the set of software instructions is potentially malicious. In another example, a set of ranges may be used, wherein a trust metric within one range may be benign, a trust metric within a second range may be potentially malicious, and a trust metric within a third range may be malicious. In other examples, the generated trust metric may comprise an indication as to whether the set of software instructions is malicious or benign, among other indications. For example, the generated trust metric may comprise a Boolean value that is indicative of whether the set of software instructions is benign. It will be appreciated that while example trust metrics are described herein, a trust metric may comprise any of a wide variety of data.

If, at determination 408, it is determined that the call stack evaluation does indicate a potential threat, flow branches YES to operation 410, where one or more corrective actions may be performed. For example, an indication or prompt may be generated and presented (e.g., to a user, a system administrator, etc.), which may comprise a display of information associated with the potential threat (e.g., a threat type, a set of software instructions associated with the potential threat, education materials, etc.) and/or one or more suggested actions. In some examples, a selection of a suggested action may be received, such that the suggested action may be performed. In another example, an entry may be generated in a log and/or an indication may be provided to another component. In other examples, corrective action may be taken automatically (e.g., terminating execution or adjusting execution parameters, access to one or more APIs, or access to memory, etc.) and/or data may be gathered for contemporaneous or later analysis. For example, if a memory management API is called to allocate executable memory, an example of adjusting an execution parameter may comprise modifying the attributes of the allocated memory to remove the executable attribute. While example actions are described herein, it will be appreciated that other actions may alternatively or additionally be performed at operation 410. Flow may then progress to operation 412, which is discussed below.

If, however, it is determined at determination 408 that the call stack evaluation does not indicate a potential threat, flow instead branches NO to operation 412, where software execution may be resumed. In other examples where software execution is not suspended, normal device operation may continue, among other examples. Flow terminates at operation 412.

Figure 4B:
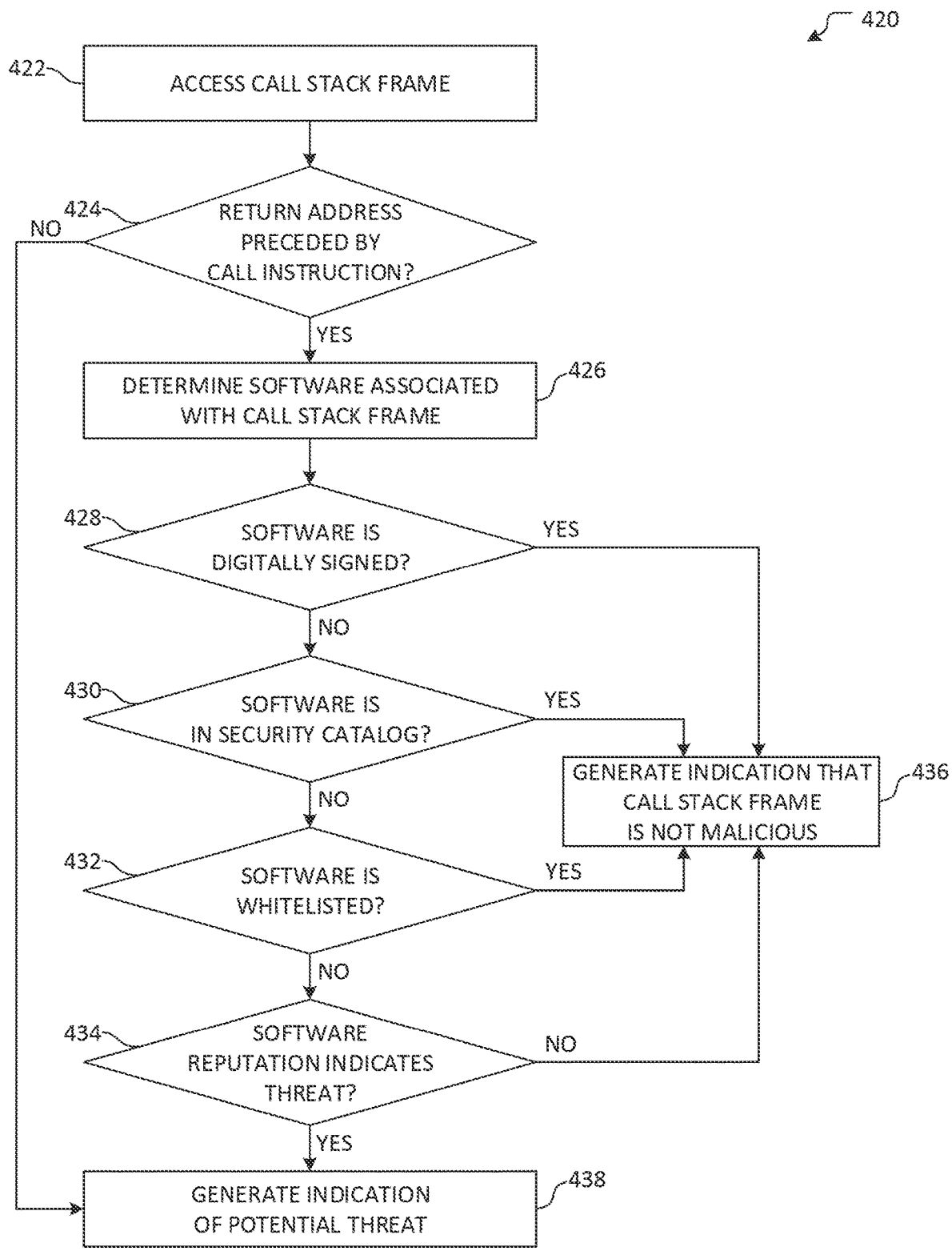
FIG. 4B illustrates an overview of an example method for evaluating a call stack frame when generating a trust metric.

FIG. 4B illustrates an overview of an example method 420 for evaluating a call stack frame when generating a trust metric. In an example, method 420 may be performed by a computing device and/or may be performed by a threat processor, such as threat processor 112 in FIG. 1 or user-mode threat processor 220/kernel-mode threat processor 224 in FIG. 2. In some examples, aspects of method 420 may be performed at determination 308 and/or determination 408, as discussed above with respect to FIGS. 3 and 4A, respectively. In an example, aspects of method 420 may be performed when performing an evaluation having a higher level of rigor as compared to other evaluations (e.g., those set forth in FIGS. 4C and 4D). For instance, aspects of method 420 may be performed when evaluating a set of software instructions attempting to allocate or map in executable memory, or when the set of software instructions accesses a kernel-mode API (e.g., API 226 in FIG. 2). While example instances are described herein, it will be appreciated that other scenarios may be subject to such an evaluation.

Method 420 begins at operation 422, where a call stack frame may be accessed. As described herein, call stack frames may be evaluated sequentially, in reverse order, or in any of a variety of other orders. In some examples, only a subset of call stack frames may be evaluated. In an example, accessing the call stack frame may comprise receiving an indication of a specific call stack frame to evaluate (e.g., as may be provided when generating a trust metric, such as at determinations 308 and/or 408 described above with respect to FIGS. 3 and 4A, respectively.

Flow progresses to determination 424, where it may be determined whether the return address for the call stack frame is preceded by a call instruction. In some examples, instances where the return address is not preceded by a call instruction may be indicative of a return-oriented-programming attack or return flow manipulation. For example, a disassembler may be used to disassemble an instruction prior to the return address in order to determine whether the instruction is a call or a syscall, among other example instructions. In some examples, the disassembler may iteratively disassemble instructions (e.g., the return address minus 1, the return address minus 2, etc.), such that a sequence of instructions may be evaluated to determine whether one or more of the instructions is a call or a syscall, etc.

If it is determined that the return address of the call stack frame is not preceded by a call instruction, flow branches NO to operation 438, where an indication that the call stack frame may pose a potential threat may be generated. In some examples, the indication may be provided to an evaluation that is generating a trust metric for a call stack, such that the evaluation may incorporate the indication into the generated trust metric. For example, a score comprising the trust metric may be decreased as a result of the indication. In another example, the trust metric may be determined to indicate that a potential threat exists, such that additional call stack frames may not be evaluated. In some examples, the trust metric may be generated such that the trust metric further comprises information associated with one or more call stack frames, which may be used when generating a log entry or generating a prompt, among other actions. Flow terminates at operation 438.

If, however, it is determined that the return address is preceded by a call instruction, flow instead branches YES to operation 426, where a set of software instructions associated with the call stack frame may be determined. In an example, the return address may refer to a set of software instructions, such that the set of software instructions may be determined based on a return address for the call stack frame. In other examples, the return address may be associated with memory that was allocated by a set of software instructions, such that the determined set of software instructions may be the set of software instructions that allocated the memory referenced by the return address. In an example, the determined set of software instructions may differ from the initial set of software instructions that called the API. For example, the determined set of software instructions may be associated with a library or other API called by the initial set of software instructions.

Flow progresses to determination 428, where it may be determined whether the set of software instructions is digitally signed. In some examples, the determination may comprise performing a cryptographic verification of the set of software instructions using a cryptographic key or certificate. In other examples, a certificate authority that issued and/or signed the cryptographic key or certificate may be validated. While example signature verification techniques are described, it will be appreciated that any of a variety of other techniques may be used.

If it is determined that the set of software instructions is digitally signed, flow branches YES to operation 436, where an indication may be generated that the call stack frame is not malicious. In some examples, the indication may be provided for incorporation into an evaluation that generates a trust metric for a call stack (e.g., determinations 308 and/or 408 in FIGS. 3 and 4A, respectively), such that the evaluation may incorporate the indication into the generated trust metric. For example, a score of the trust metric may be increased or may remain the same as a result of the indication. In an example, aspects of the evaluation performed by method 420 may be cached as a cache entry, such that a later call stack frame having the same return address may be evaluated based at least in part on the cached evaluation, which may thereby reduce at least a part of the processing associated with the evaluation. Flow terminates at operation 436.

If, however, it is not determined that the set of software instructions is digitally signed, flow instead branches NO to determination 430, where it may be determined whether the set of software instructions is listed in a trusted security catalog. For example, the trusted security catalog may be provided by an OS executing on the computing device, and may comprise one or more hashes, GUIDs, or other information that may be used to validate the set of software instructions. If it is determined that the set of software instructions is listed in the trusted security catalog, flow branches YES to operation 436 where an indication may be generated that the call stack frame is not malicious, as was discussed above.

If, however, it is determined that the set of software instructions is not listed in the trusted security catalog, flow instead branches NO to operation 432, where it may be determined whether the set of software instructions has been whitelisted. As described above, a whitelist may be generated based on received input from a user or administrator, or may be generated automatically based on an evaluation of software existing on the computing device, among other examples. In some examples, the evaluation may comprise evaluating a blacklist to determine whether the set of software instructions has been blacklisted. If it is determined that the set of software instructions has been whitelisted (and/or, in some examples, has not been blacklisted), flow branches YES to operation 436, where an indication may be generated that the call stack frame is not malicious, as was discussed above.

If, however, it is determined that the set of software instructions has not been whitelisted, flow instead branches NO to operation 434, where it may be determined whether reputation information associated with the set of software instructions indicates that the set of software instructions may be a threat. As discussed above, the reputation information may be retrieved from a local reputation data store (e.g., reputation data store 116 in FIG. 1 or reputation data store 210 in FIG. 2) and/or maybe retrieved from a remote reputation data store (e.g., reputation data store 118 in FIG. 1). In some examples, the determination may comprise using a threshold information to evaluate at least a part of the reputation information, wherein if the reputation information is below the threshold, the set of software instructions may be determined to pose a potential threat. In other examples, the determination may comprise evaluating an indication provided by the reputation information, wherein the reputation information may indicate that the set of software instructions are malicious or benign, among other indications. While example evaluations of reputation information are described herein, it will be appreciated that reputation information may comprise any of a variety of information and, accordingly, may be evaluated using any of a variety of techniques.

If it is determined that the reputation information does not indicate that the set of software instructions is not a potential threat, flow branches NO to operation 436, which is described above. However, if it is determined that the reputation information indicates that the set of software instructions is a potential threat, flow instead branches YES to operation 438, where an indication that the set of software instructions may be a potential threat may be generated, as was discussed above. Thus, flow terminates at one of operations 436 or 438. It will be appreciated that while FIG. 4B is described herein as having an example flow (e.g., from operations 428 to 434), other examples may comprise a different order of operations, or additional, alternative, or fewer operations may be performed.

Figure 4C:
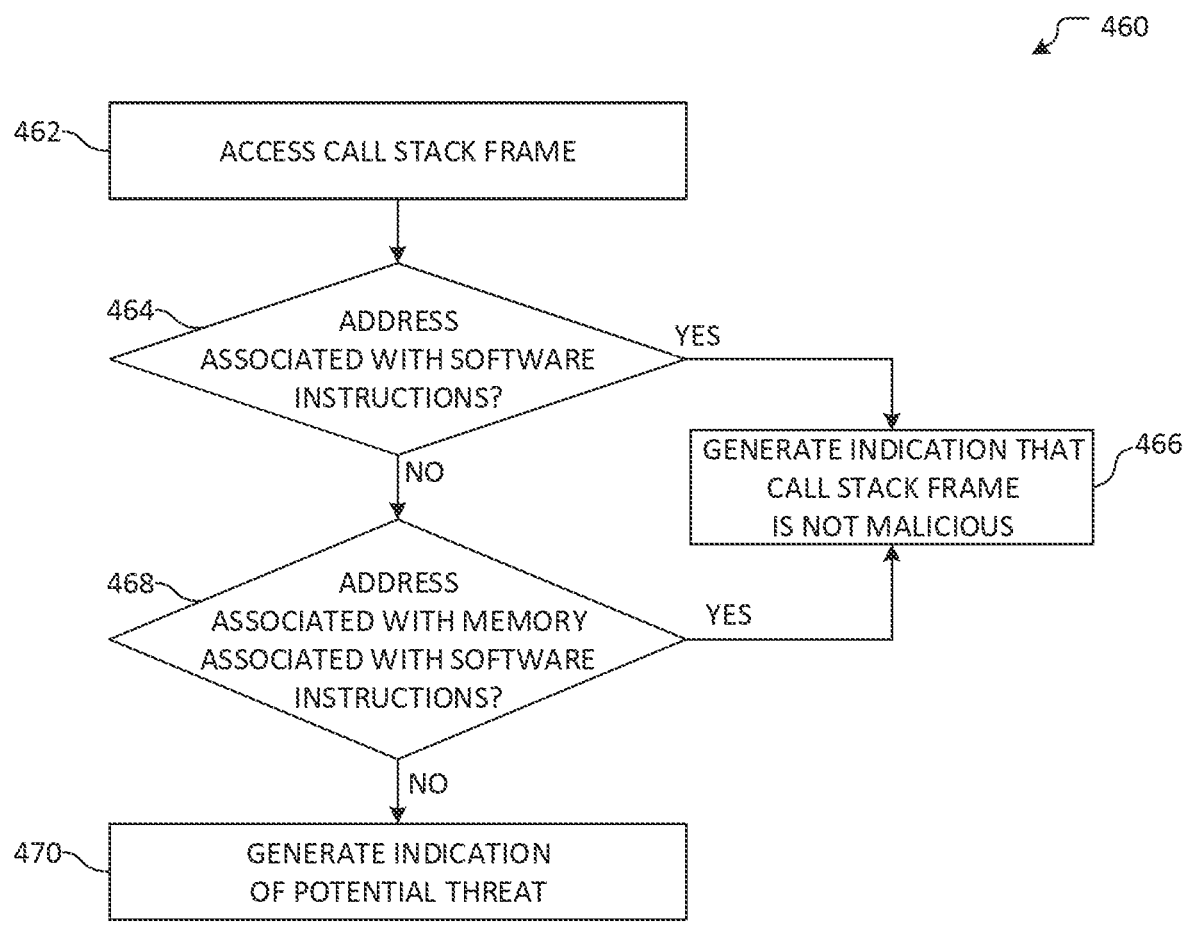
FIG. 4C illustrates an overview of an example method for evaluating a call stack frame when generating a trust metric.

FIG. 4C illustrates an overview of an example method 460 for evaluating a call stack frame when generating a trust metric. In an example, method 460 may be performed by a computing device and/or may be performed by a threat processor, such as threat processor 112 in FIG. 1 or user-mode threat processor 220/kernel-mode threat processor 224 in FIG. 2. In some examples, aspects of method 460 may be performed at determination 308 and/or determination 408, as discussed above with respect to FIGS. 3 and 4A, respectively. In an example, aspects of method 460 may be performed when performing an evaluation having a medium-to-low level of rigor as compared to other evaluations (e.g., those set forth in FIGS. 4B and 4D). For instance, aspects of method 460 may be performed when evaluating a set of software instructions attempting to perform behavior that is normal or routine, including, but not limited to, creating a new processing thread, accessing an image capture API, or interacting with sensors of a computing device. While example instances are described herein, it will be appreciated that other scenarios may be subject to such an evaluation.

Method 460 begins at operation 462, where a call stack frame may be accessed. As described herein, call stack frames may be evaluated sequentially, in reverse order, or in any of a variety of other orders. In some examples, only a subset of call stack frames may be evaluated. In an example, accessing the call stack frame may comprise receiving an indication of a specific call stack frame to evaluate (e.g., as may be provided when generating a trust metric, such as at determinations 308 and/or 408 described above with respect to FIGS. 3 and 4A, respectively.

Flow progresses to determination 464, where it may be determined whether an address is associated with a set of software instructions. For example, the address may be a return address, a start address (e.g., when a new thread is started), or any of a variety of other addresses. Further, it will be appreciated that while examples herein are described with respect to a return address, similar techniques may be used for other types of addresses. Accordingly, if it is determined that the address is associated with a set of software instructions, flow branches YES to operation 466, where an indication may be generated that the call stack frame is not malicious. In some examples, the indication may be provided for incorporation into an evaluation that generates a trust metric for a call stack (e.g., determinations 308 and/or 408 in FIGS. 3 and 4A, respectively), such that the evaluation may incorporate the indication into the generated trust metric. For example, a score of the trust metric may be increased or may remain the same as a result of the indication. In an example, aspects of the evaluation performed by method 460 may be cached as a cache entry, such that a later call stack frame having the same return address may be evaluated based at least in part on the cached evaluation, which may thereby reduce at least a part of the processing associated with the evaluation. Flow terminates at operation 466.

If, however, it is determined that the address is not associated with a set of software instructions, flow instead branches NO to determination 468, where it may be determined whether the address is associated with memory allocated by a set of software instructions. Accordingly, if it is determined that the address is associated with memory that has been allocated by a set of software instructions, flow branches YES to operation 466, where an indication may be generated that the call stack frame is not malicious, as discussed above. However, if it is determined that the address is not associated with memory that is associated with a set of software instructions, flow instead branches NO to operation 470, where an indication that the call stack frame may pose a potential threat may be generated. In some examples, the indication may be provided to an evaluation that is generating a trust metric for a call stack, such that the evaluation may incorporate the indication into the generated trust metric. For example, a score comprising the trust metric may be decreased as a result of the indication. In another example, the trust metric may be determined to indicate that a potential threat exists, such that additional call stack frames may not be evaluated. In some examples, the trust metric may be generated such that the trust metric further comprises information associated with one or more call stack frames, which may be used when generating a log entry or generating a prompt, among other actions. Flow terminates at operation 470.

Figure 4D:
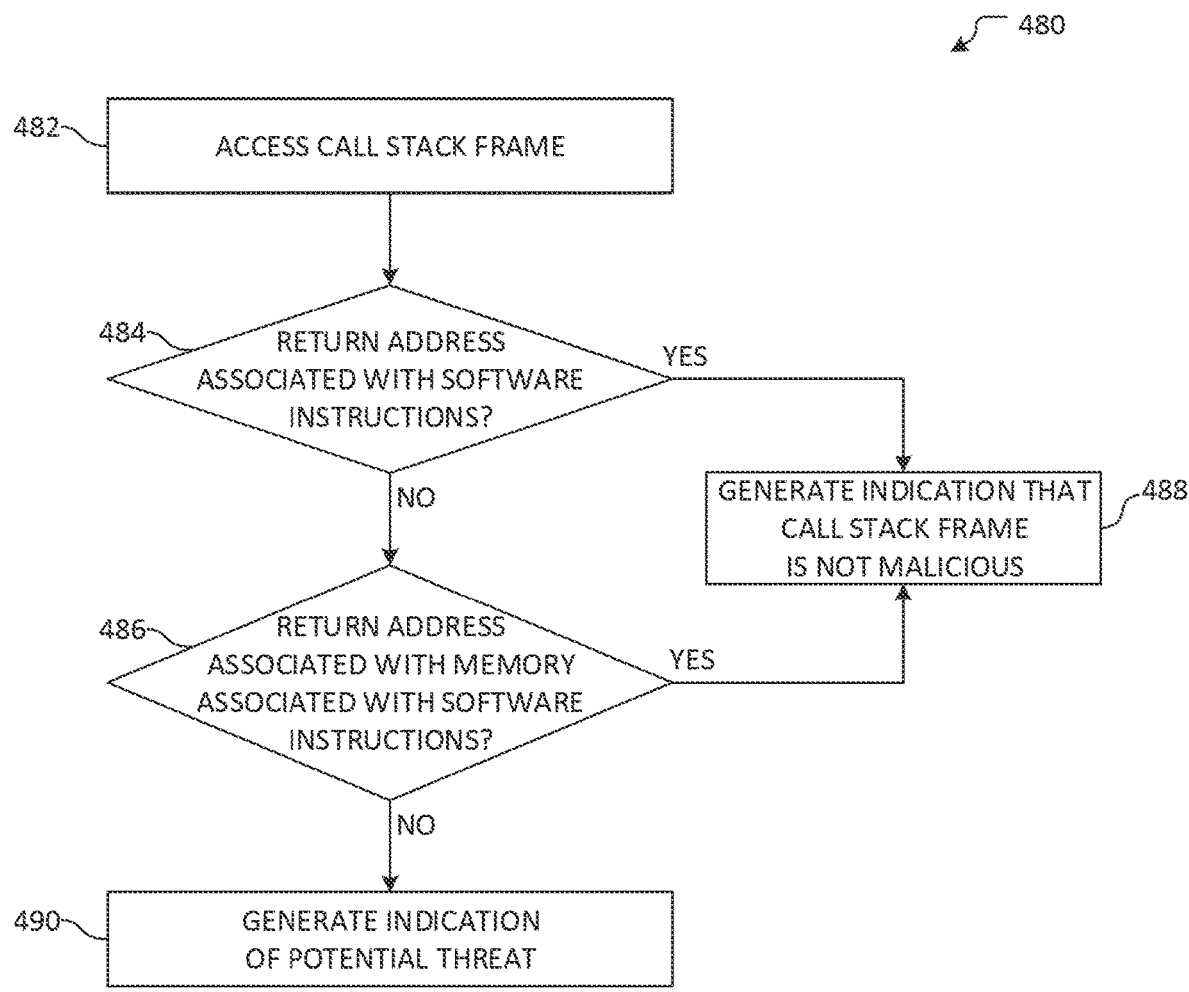
FIG. 4D illustrates an overview of an example method for evaluating a call stack frame when generating a trust metric.

FIG. 4D illustrates an overview of an example method 480 for evaluating a call stack frame when generating a trust metric. In an example, method 480 may be performed by a computing device and/or may be performed by a threat processor, such as threat processor 112 in FIG. 1 or user-mode threat processor 220/kernel-mode threat processor 224 in FIG. 2. In some examples, aspects of method 480 may be performed at determination 308 and/or determination 408, as discussed above with respect to FIGS. 3 and 4A, respectively. In an example, aspects of method 480 may be performed when performing an evaluation having a low level of rigor as compared to other evaluations (e.g., those set forth in FIGS. 4B and 4C). For instance, aspects of method 480 may be performed when evaluating a set of software instructions attempting to perform behavior that is normal or routine, including, but not limited to, creating a new processing thread, accessing a data logging API, or receiving user input. While example instances are described herein, it will be appreciated that other scenarios may be subject to such an evaluation.

Method 480 begins at operation 482, where a call stack frame may be accessed. As described herein, call stack frames may be evaluated sequentially, in reverse order, or in any of a variety of other orders. In some examples, only a subset of call stack frames may be evaluated. In an example, accessing the call stack frame may comprise receiving an indication of a specific call stack frame to evaluate (e.g., as may be provided when generating a trust metric, such as at determinations 308 and/or 408 described above with respect to FIGS. 3 and 4A, respectively.

Flow progresses to determination 484, where it may be determined whether the return address is associated with a set of software instructions. For example, if the return address is instead associated with memory allocated by a set of software instructions (i.e., indirectly associated rather than directly associated), it may not be determined that the return address is associated with the set of software instructions. Accordingly, if it is determined that the return address is associated with a set of software instructions, flow branches YES to operation 488, where an indication may be generated that the call stack frame is not malicious. In some examples, the indication may be provided for incorporation into an evaluation that generates a trust metric for a call stack (e.g., determinations 308 and/or 408 in FIGS. 3 and 4A, respectively), such that the evaluation may incorporate the indication into the generated trust metric. For example, a score of the trust metric may be increased or may remain the same as a result of the indication. In an example, aspects of the evaluation performed by method 480 may be cached as a cache entry, such that a later call stack frame having the same return address may be evaluated based at least in part on the cached evaluation, which may thereby reduce at least a part of the processing associated with the evaluation. Flow terminates at operation 488.

If, however, it is determined that the return address of the call stack frame is not associated with a set of software instructions, flow instead branches NO to operation 486, where it may be determined whether the return address is associated with memory allocated by a set of software instructions. Accordingly, if it is determined that the return address is associated with memory that has been allocated by a set of software instructions, flow branches YES to operation 488, where an indication may be generated that the call stack frame is not malicious.

However, if it is determined that the return address is not associated with memory that is associated with a set of software instructions, flow instead branches NO to operation 490, where an indication that the call stack frame may pose a potential threat may be generated. In some examples, the indication may be provided to an evaluation that is generating a trust metric for a call stack, such that the evaluation may incorporate the indication into the generated trust metric. For example, a score comprising the trust metric may be decreased as a result of the indication. In another example, the trust metric may be determined to indicate that a potential threat exists, such that additional call stack frames may not be evaluated. In some examples, the trust metric may be generated such that the trust metric further comprises information associated with one or more call stack frames, which may be used when generating a log entry or generating a prompt, among other actions. Flow terminates at operation 490.

Figure 5:
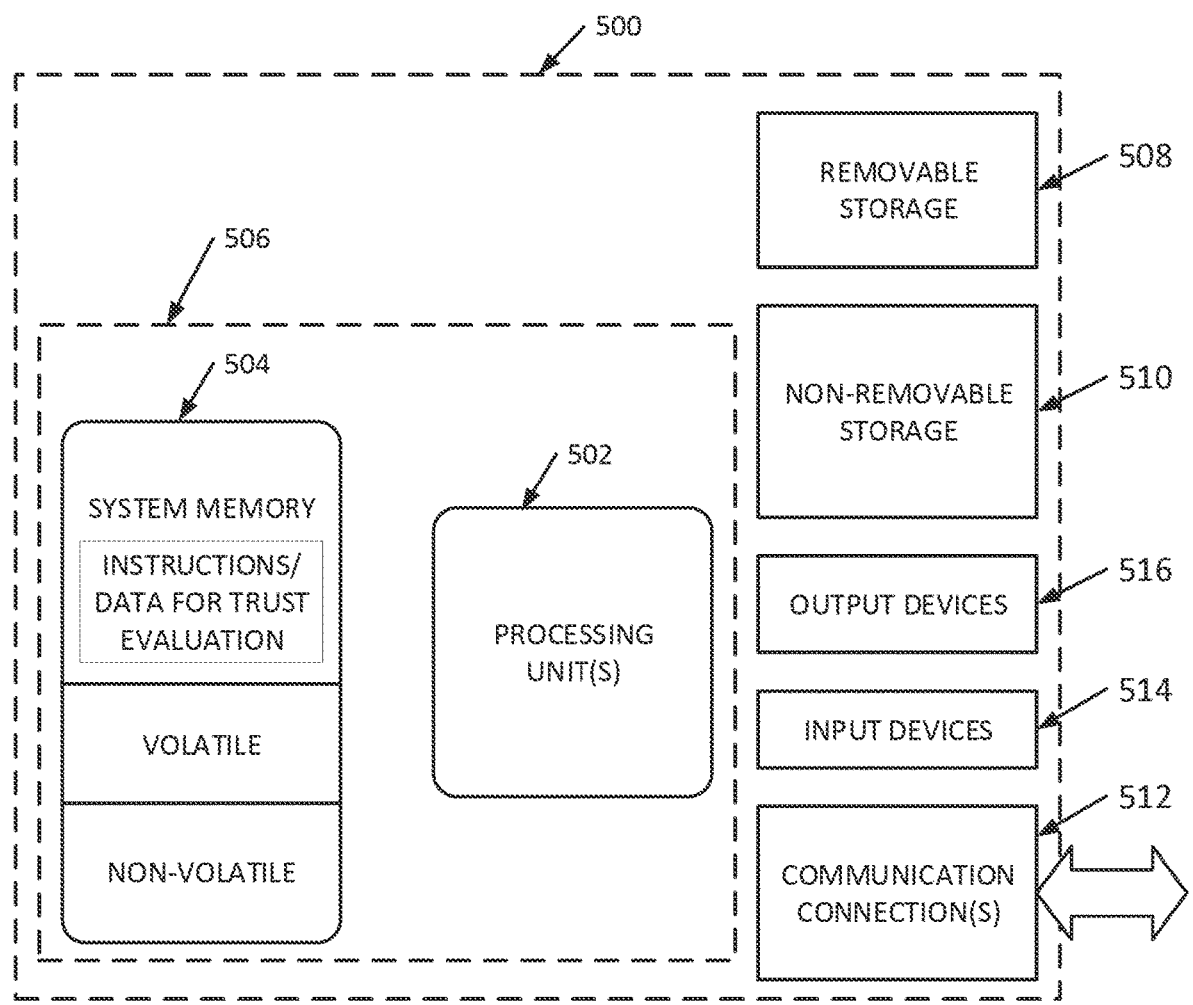
FIG. 5 illustrates one example of a suitable operating environment in which one or more of the present embodiments may be implemented.

FIG. 5 illustrates one example of a suitable operating environment 500 in which one or more of the present embodiments may be implemented. This is only one example of a suitable operating environment and is not intended to suggest any limitation as to the scope of use or functionality. Other well-known computing systems, environments, and/or configurations that may be suitable for use include, but are not limited to, personal computers, server computers, hand-held or laptop devices, multiprocessor systems, microprocessor-based systems, programmable consumer electronics such as smart phones, network PCs, minicomputers, mainframe computers, distributed computing environments that include any of the above systems or devices, and the like.

In its most basic configuration, operating environment 500 typically includes at least one processing unit 502 and memory 504. Depending on the exact configuration and type of computing device, memory 504 (storing, among other things, reputation information, a whitelist and/or blacklist, instructions to perform the methods disclosed herein, etc.) may be volatile (such as RAM), non-volatile (such as ROM, flash memory, etc.), or some combination of the two. This most basic configuration is illustrated in FIG. 5 by dashed line 506. Further, environment 500 may also include storage devices (removable, 508, and/or non-removable, 510) including, but not limited to, magnetic or optical disks or tape. Similarly, environment 500 may also have input device(s) 514 such as keyboard, mouse, pen, voice input, etc. and/or output device(s) 516 such as a display, speakers, printer, etc. Also included in the environment may be one or more communication connections, 512, such as LAN, WAN, point to point, etc.

Operating environment 500 typically includes at least some form of computer readable media. Computer readable media can be any available media that can be accessed by processing unit 502 or other devices comprising the operating environment. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other tangible, non-transitory medium which can be used to store the desired information. Computer storage media does not include communication media.

Communication media embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The operating environment 500 may be a single computer operating in a networked environment using logical connections to one or more remote computers. The remote computer may be a personal computer, a server, a router, a network PC, a peer device or other common network node, and typically includes many or all of the elements described above as well as others not so mentioned. The logical connections may include any method supported by available communications media. Such networking environments are commonplace in offices, enterprise-wide computer networks, intranets and the Internet.

As will be understood from the foregoing disclosure, one aspect of the technology relates to a system comprising: at least one processor; and memory storing instructions that, when executed by the at least one processor, causes the system to perform a set of operations. The set of operations comprises: generating, by a threat processor, a hook on an application programming interface (API), wherein the hook is associated with the threat processor; receiving, in response to a set of software instructions calling the API, an indication from the generated hook; based on the received indication, accessing a call stack associated with an execution of the set of software instructions, wherein the call stack comprises one or more call stack frames; generating a trust metric for the execution of the set of software instructions based on at least one of the one or more call stack frames; determining, based on an evaluation of the generated trust metric, that the set of software instructions poses a threat to computer security; and based on determining that the set of software instructions poses a threat to computer security, performing a corrective action. In an example, generating the trust metric comprises performing at least one evaluation selected from the group consisting of: determining whether a return address associated with a call stack frame of the one or more call stack frames is preceded by a call instruction; determining whether an address associated with a call stack frame of the one or more call stack frames is associated with the set of software instructions; determining whether an address associated with a call stack from of the one or more call stack frames is associated with a memory, wherein the memory is associated with the set of software instructions; determining whether the set of software instructions is digitally signed; determining whether the set of software instructions is in a trusted security catalog; determining whether the set of software instructions is whitelisted; and evaluating reputation information associated with the set of software instructions. In another example, generating the trust metric comprises determining that a cache comprises a cache entry for a return address associated with a call stack frame, and the trust metric is generated based at least in part on the cache entry. In a further example, generating the trust metric comprises generating a cache entry in a cache for a return address of a call stack frame, wherein the cache entry comprises information associated with the at least one evaluation. In yet another example, evaluating reputation information comprises: determining whether a local reputation data store comprises the reputation information; when it is determined that the local reputation data store comprises the reputation information, accessing the reputation information from the local reputation data store; and when it is determined that the local reputation data store does not comprise the reputation information, accessing the reputation information from a security service. In a further still example, performing the corrective action comprises performing at least one action from the group consisting of: generating a prompt comprising information associated with the threat; generating an entry in a log comprising information associated with the threat; terminating execution of the set of software instructions; adjusting an execution parameter of the execution of the set of software instructions; and gathering data associated with the execution of the set of software instructions. In another example, the set of operations further comprises: evaluating a computing device having one or more sets of software instructions to generate a whitelist indicating at least one of the one or more sets of software instructions is whitelisted; and storing the generated whitelist in a local reputation data store.

In another aspect, the technology relates to a method for detecting a set of software instructions that pose a potential threat to computer security. The method comprises: generating, by a threat processor, a hook on an application programming interface (API), wherein the hook is associated with the threat processor; receiving, by the threat processor, an indication from the generated hook that a set of software instructions has called the API; based on the received indication, accessing a call stack associated with an execution of the set of software instructions, wherein the call stack comprises one or more call stack frames; generating a trust metric for the execution of the set of software instructions based on at least one of the one or more call stack frames, wherein the trust metric is generated based on at least one evaluation selected from the group consisting of: determining whether a return address associated with a call stack frame of the one or more call stack frames is preceded by a call instruction; determining whether an address associated with a call stack frame of the one or more call stack frames is associated with the set of software instructions; determining whether an address associated with a call stack from of the one or more call stack frames is associated with a memory, wherein the memory is associated with the set of software instructions; determining whether the set of software instructions is digitally signed; determining whether the set of software instructions is in a trusted security catalog; determining whether the set of software instructions is whitelisted; and evaluating reputation information associated with the set of software instructions; determining, based on an evaluation of the generated trust metric, that the set of software instructions poses a threat to computer security; and based on determining that the set of software instructions poses a threat to computer security, performing a corrective action. In an example, the trust metric is evaluated based on a threshold, and a trust metric below the threshold indicates that the set of software instructions poses a threat to computer security. In another example, the at least one evaluation is selected based on a type associated with the API called by the set of software instructions. In a further example, the method further comprises: evaluating one or more sets of software instructions to generate a whitelist indicating at least one of the one or more sets of software instructions is whitelisted; and storing the generated whitelist in a local reputation data store. In yet another example, receiving the indication further comprises suspending the execution of the set of software instructions, and the method further comprises resuming the execution of the set of software instructions when it is determined that the set of software instructions does not pose a threat to computer security. In a further still example, performing the corrective action comprises performing at least one action from the group consisting of: generating a prompt comprising information associated with the threat; generating an entry in a log comprising information associated with the threat; terminating execution of the set of software instructions; adjusting an execution parameter of the execution of the set of software instructions; and gathering data associated with the execution of the set of software instructions.

In a further aspect, the technology relates to a method for detecting a set of software instructions that pose a potential threat to computer security. The method comprises: generating, by a threat processor, a hook on an application programming interface (API), wherein the hook is associated with the threat processor; receiving, in response to a set of software instructions calling the API, an indication from the generated hook; based on the received indication, accessing a call stack associated with an execution of the set of software instructions, wherein the call stack comprises one or more call stack frames; generating a trust metric for the execution of the set of software instructions based on at least one of the one or more call stack frames; determining, based on an evaluation of the generated trust metric, that the set of software instructions poses a threat to computer security; and based on determining that the set of software instructions poses a threat to computer security, performing a corrective action. In an example, generating the trust metric comprises performing at least one evaluation selected from the group consisting of: determining whether a return address associated with a call stack frame of the one or more call stack frames is preceded by a call instruction; determining whether an address associated with a call stack frame of the one or more call stack frames is associated with the set of software instructions; determining whether an address associated with a call stack from of the one or more call stack frames is associated with a memory, wherein the memory is associated with the set of software instructions; determining whether the set of software instructions is digitally signed; determining whether the set of software instructions is in a trusted security catalog; determining whether the set of software instructions is whitelisted; and evaluating reputation information associated with the set of software instructions. In another example, generating the trust metric comprises determining that a cache comprises a cache entry for a return address associated with a call stack frame, and the trust metric is generated based at least in part on the cache entry. In a further example, generating the trust metric comprises generating a cache entry in a cache for a return address of a call stack frame, wherein the cache entry comprises information associated with the at least one evaluation. In yet another example, evaluating reputation information comprises: determining whether a local reputation data store comprises the reputation information; when it is determined that the local reputation data store comprises the reputation information, accessing the reputation information from the local reputation data store; and when it is determined that the local reputation data store does not comprise the reputation information, accessing the reputation information from a security service. In a further still example, performing the corrective action comprises performing at least one action from the group consisting of: generating a prompt comprising information associated with the threat; generating an entry in a log comprising information associated with the threat; terminating execution of the set of software instructions; adjusting an execution parameter of the execution of the set of software instructions; and gathering data associated with the execution of the set of software instructions. In another example, the method further comprises: evaluating a computing device having one or more sets of software instructions to generate a whitelist indicating at least one of the one or more sets of software instructions is whitelisted; and storing the generated whitelist in a local reputation data store.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processor; and
a memory storing computer-executable instructions executable by the processor, the computer-executable instructions comprising instructions for:
generating a hook on an application programming interface (API);
receiving, in response to a set of software instructions calling the API, an indication from the generated hook;
based on the received indication, accessing a call stack associated with an execution of the set of software instructions, the call stack comprising a call stack frame;
generating a trust metric for an execution of the set of software instructions, wherein generating the trust metric for the execution of the set of software instructions comprises evaluating the call stack to generate an indication of a potential threat, the trust metric based on the indication of the potential threat determined from evaluating the call stack frame;
determining, based on an evaluation of the generated trust metric, that the set of software instructions poses a threat to computer security; and
based on determining that the set of software instructions poses a threat to computer security, performing a corrective action.

2. The system of claim 1, wherein the set of computer-executable instructions comprises instructions for evaluating the call stack, wherein the instructions for evaluating the call stack comprise instructions for:
making a determination that a return address associated with the call stack frame is not preceded by a call instruction; and
generating the indication of the potential threat based on the determination that the return address associated with the call stack frame is not preceded by the call instruction.

3. The system of claim 2, wherein the instructions for evaluating the call stack further comprise instructions for:
determining that the set of software instructions are not digitally signed;
determining that the set of software instructions are not in a trusted security catalog;
determining that that the set of software instructions are not whitelisted;
determining that a software reputation indicates a threat; and
based on a determination that the set of software instructions are not digitally signed, a determination that the set of software instructions are not in the trusted security catalog, the set of software instructions are not whitelisted, and that the software reputation indicates the potential threat, generating the indication of the potential threat.

4. The system of claim 3, wherein the set of computer-executable instructions further comprise instructions for:
determining that the return address is not associated with a memory location associated with the set of software instructions; and
based on a determination that the return address is not associated with the set of software instructions, generating the indication of the potential threat.

5. The system of claim 1, wherein generating the trust metric comprises evaluating reputation information and wherein evaluating the reputation information comprises:
determining whether a local reputation data store comprises the reputation information;
when it is determined that the local reputation data store comprises the reputation information, accessing the reputation information from the local reputation data store; and
when it is determined that the local reputation data store does not comprise the reputation information, accessing the reputation information from a security service.

6. The system of claim 1, wherein performing the corrective action comprises performing at least one action from the group consisting of:
generating a prompt comprising information associated with the threat;
generating an entry in a log comprising information associated with the threat;
terminating execution of the set of software instructions;
adjusting an execution parameter of the execution of the set of software instructions; and
gathering data associated with the execution of the set of software instructions.

7. The system of claim 1, wherein the computer-executable instructions comprise instructions for:
evaluating a computing device to generate a whitelist indicating the set of software instructions is whitelisted; and
storing the generated whitelist in a local reputation data store.

8. A computer program product comprising a non-transitory, computer-readable medium storing thereon a set of computer-executable instructions executable by processor, the computer-executable instructions comprising instructions for:
generating a hook on an application programming interface (API);
receiving, in response to a set of software instructions calling the API, an indication from the generated hook;
based on the received indication, accessing a call stack associated with an execution of the set of software instructions, the call stack comprising a call stack frame;
generating a trust metric for an execution of the set of software instructions, wherein generating the trust metric for the execution of the set of software instructions comprises evaluating the call stack to generate an indication of a potential threat, the trust metric based on the indication of the potential threat determined from evaluating the call stack frame;
determining, based on an evaluation of the generated trust metric, that the set of software instructions poses a threat to computer security; and
based on determining that the set of software instructions poses the threat to computer security, performing a corrective action.

9. The computer program product of claim 8, wherein the set of computer-executable instructions comprises instructions for evaluating the call stack, wherein the instructions for evaluating the call stack comprise instructions for:

making a determination that a return address associated with the call stack frame is not preceded by a call instruction; and generating the indication of the potential threat based on the determination that the return address associated with the call stack frame is not preceded by the call instruction.

10. The computer program product of claim 9, wherein the instructions for evaluating the call stack further comprise instructions for:

determining that the set of software instructions are not digitally signed;

determining that the set of software instructions are not in a trusted security catalog;

determining that that the set of software instructions are not whitelisted;

determining that a software reputation indicates a threat; and based on a determination that the set of software instructions are not digitally signed, a determination that the set of software instructions are not in the trusted security catalog, the set of software instructions are not whitelisted, and that the software reputation indicates the potential threat, generating the indication of the potential threat.

11. The computer program product of claim 10 wherein the instructions for evaluating the call stack further comprise instructions for:

determining that the return address is not associated with a memory location associated with the set of software instructions; and based on a determination that the return address is not associated with the set of software instructions, generating the indication of the potential threat.

12. The computer program product of claim 8, wherein the set of computer-executable instructions comprises instructions for:

determining whether a local reputation data store comprises reputation information;

when it is determined that the local reputation data store comprises the reputation information, accessing the reputation information from the local reputation data store; and when it is determined that the local reputation data store does not comprise the reputation information, accessing the reputation information from a security service; and wherein generating the trust metric comprises evaluating the reputation information.

13. The computer program product of claim 8, wherein performing the corrective action comprises performing at least one action from the group consisting of:

generating a prompt comprising information associated with the threat;

generating an entry in a log comprising information associated with the threat;

terminating execution of the set of software instructions;

adjusting an execution parameter of the execution of the set of software instructions; and gathering data associated with the execution of the set of software instructions.

14. A computer implemented method comprising:

generating a hook on an application programming interface (API);

receiving, in response to a set of software instructions calling the API, an indication from the generated hook;

based on the received indication, accessing a call stack associated with an execution of the set of software instructions, the call stack comprising a call stack frame;

generating a trust metric for an execution of the set of software instructions, wherein generating the trust metric for the execution of the set of software instructions comprises evaluating the call stack to generate an indication of a potential threat, the trust metric based on the indication of the potential threat determined from evaluating the call stack frame;

determining, based on an evaluation of the generated trust metric, that the set of software instructions poses a threat to computer security; and based on determining that the set of software instructions poses the threat to computer security, performing a corrective action.

15. The computer implemented method of claim 14, wherein evaluating the call stack comprises evaluating the call stack, wherein evaluating the call stack comprises:

making a determination that a return address associated with the call stack frame is not preceded by a call instruction; and generating the indication of the potential threat based on the determination that the return address associated with the call stack frame is not preceded by the call instruction.

16. The computer implemented method of claim 15, wherein evaluating the call stack further comprises:

determining that the set of software instructions are not digitally signed;

determining that the set of software instructions are not in a trusted security catalog;

determining that that the set of software instructions are not whitelisted;

determining that a software reputation indicates a threat; and based on a determination that the set of software instructions are not digitally signed, a determination that the set of software instructions are not in the trusted security catalog, the set of software instructions are not whitelisted, and that the software reputation indicates the potential threat, generating the indication of the potential threat.

17. The computer implemented method of claim 16, wherein evaluating the call stack further comprises:

determining that the return address is not associated with a memory location associated with the set of software instructions; and based on a determination that the return address is not associated with the set of software instructions, generating the indication of the potential threat.

18. The computer implemented method of claim 14, wherein generating the trust metric comprising evaluating reputation information and wherein the method further comprises:

determining that a local reputation data store does not comprise the reputation information; and based on a determination that the local reputation data store does not comprise the reputation information, accessing the reputation information from a security service.

19. The computer implemented method of claim 14, wherein generating the trust metric comprising evaluating reputation information and wherein the method further comprises:

determining that a local reputation data store comprises the reputation information; and based on a determination that the local reputation data store comprises the reputation information, accessing the reputation information from the local reputation data store.

20. The computer implemented method of claim 14, wherein performing the corrective action comprises performing at least one action from the group consisting of:

generating a prompt comprising information associated with the threat;

generating an entry in a log comprising information associated with the threat;

terminating execution of the set of software instructions;

adjusting an execution parameter of the execution of the set of software instructions; and gathering data associated with the execution of the set of software instructions.

\* \* \* \* \*